(12) United States Patent
Yun

(10) Patent No.: US 7,515,328 B2
(45) Date of Patent: Apr. 7, 2009

(54) APPARATUS FOR RESETTING LOCATION OF REFLECTIVE PART OF DIFFRACTIVE OPTICAL MODULATOR

(75) Inventor: Sang Kyeong Yun, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 34 days.

(21) Appl. No.: 11/848,057

(22) Filed: Aug. 30, 2007

(65) Prior Publication Data
US 2008/0055693 A1  Mar. 6, 2008

(30) Foreign Application Priority Data
Aug. 30, 2006  (KR) ...................... 10-2006-0082839

(51) Int. Cl.
*G02F 26/00* (2006.01)
*G09G 3/16* (2006.01)
(52) U.S. Cl. ...................... 359/291; 359/290; 359/292; 345/48
(58) Field of Classification Search ................... 345/48; 359/290, 291, 292, 572, 573, 578
See application file for complete search history.

(56) References Cited

U.S. PATENT DOCUMENTS

| 6,934,070 | B1 * | 8/2005 | Maheshwari et al. | 359/290 |
| 7,209,290 | B2 * | 4/2007 | An et al. | 359/572 |
| 7,388,181 | B2 * | 6/2008 | Han et al. | 250/205 |
| 7,443,594 | B2 * | 10/2008 | Yang et al. | 359/640 |
| 2008/0218837 | A1 * | 9/2008 | Yang et al. | 359/239 |

* cited by examiner

*Primary Examiner*—David N Spector
(74) *Attorney, Agent, or Firm*—Christensen O'Connor Johnson Kindness PLLC

(57) ABSTRACT

The present invention relates generally to an apparatus for resetting the location of the reflective part of a diffractive optical modulator. More particularly, the present invention relates to an apparatus for resetting the location of the reflective part of a diffractive optical modulator, which resets the location of the reflective part of the diffractive optical modulator to an initial location thereof at a specific time point, thus increasing the ability to control the location of the reflective part.

13 Claims, 9 Drawing Sheets

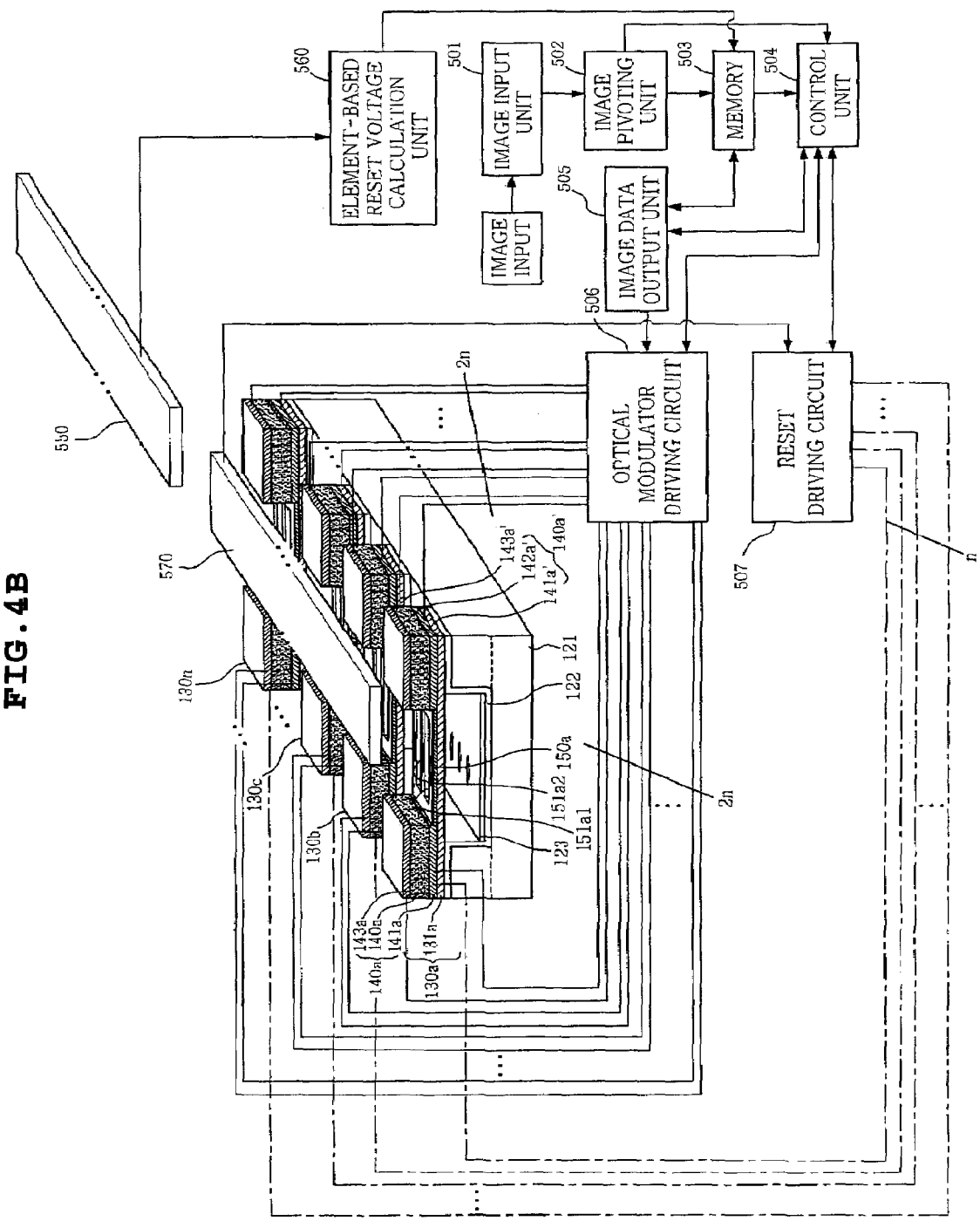

APPARATUS FOR RESETTING LOCATION OF REFLECTIVE PART OF DIFFRACTIVE OPTICAL MODULATOR

CROSS REFERENCE TO RELATED APPLICATION

This application claims the benefit of Korean Patent Application No. 10-2006-0082839, filed on Aug. 30, 2006, entitled "Resetting Apparatus of the Reflective Part in the Optical Diffractive Modulator", which is hereby incorporated by reference in its entirety into this application.

BACKGROUND OF THE INVENTION

1. Field of the Invention

The present invention relates generally to an apparatus for resetting the location of the reflective part of a diffractive optical modulator. More particularly, the present invention relates to an apparatus for resetting the location of the reflective part of a diffractive optical modulator, which resets the location of the reflective part of the diffractive optical modulator to an initial location thereof at a specific time point, thus increasing the ability to control the location of the reflective part.

2. Description of the Related Art

With the development of micro-technology, micro-machine (Micro-Electro-Mechanical System: MEMS) devices and small-sized apparatuses in which MEMS devices are included are attracting attention.

Recently, spatial optical modulators using such MEMS devices have been developed. An example of such spatial optical modulators is a diffractive optical modulator.

FIG. 1 is a perspective view showing a conventional open hole-based diffractive optical modulator.

Referring to FIG. 1, the open hole-based diffractive optical modulator includes a silicon substrate 121, an insulating layer 122, a lower reflective part 123, and a plurality of actuating elements 130a to 130n.

The lower reflective part 123 is deposited on the silicon substrate 121 and is adapted to reflect incident light. Material used for the lower reflective part 123 may include a metal material, such as Al, Pt, Cr, or Ag.

An actuating element (as a representative, the actuating element designated by reference numeral 130a is described, but the remaining actuating elements are constructed in the same way) is formed in a ribbon shape, and includes a lower support 131a the bottom surfaces of opposite ends of which are respectively attached to opposite locations on the silicon substrate 121 deviating from the recess part of the silicon substrate 121, so that the center portion of the lower support 131a is arranged to be spaced apart from the recess part.

Piezoelectric layers 140 and 140' are provided on the opposite ends of the lower support 131a, and the actuating force of the actuating element 130a is provided by the contraction or expansion of the provided piezoelectric layers 140a and 140a'.

Each of the left and right piezoelectric layers 140a and 140a' includes a lower electrode layer 141a or 141' for supplying piezoelectric voltage, a piezoelectric material layer 142a or 142a stacked on the lower electrode layer 141a or 141a' and adapted to contract or expand when voltage is applied to both surfaces of the piezoelectric material layer, thus generating a vertical actuating force, and an upper electrode layer 143a or 143a' stacked on the piezoelectric material layer 142a or 142a' and adapted to supply piezoelectric voltage to the piezoelectric material layer 142a or 142a'.

When voltage is applied both to the upper electrode layer 143a or 143a' and the lower electrode layer 141a or 141a', the piezoelectric material layer 142a or 142a' contracts or expands, thus causing vertical motion of the lower support 131a.

Meanwhile, the lower support 131a is provided with an upper reflective part 150a deposited on the center portion thereof, and is provided with a plurality of open holes 151a1 and 151a2 formed therein.

Such open holes 151a1 and 151a2 allow light incident on the actuating element 130a to pass therethrough and to be incident on the lower reflective part 123 corresponding to the location at which the open hole 151a1 or 151a2 is formed, thus enabling light reflected from the lower reflective part 123 and light reflected from the upper reflective part 150a to form diffracted light.

In this case, the light, which is incident on the actuating element 130a while passing through the open hole 151a1 or 151a2 of the upper reflective part 150a, can be incident on the corresponding location of the lower reflective part 123. In the case where the distance between the upper reflective part 150a and the lower reflective part 123 is a multiple of an odd number of $\lambda/4$ when the wavelength of incident light is $\lambda$, the most diffracted light is generated.

A single upper reflective part 150a and a lower reflective part 123 corresponding thereto can form scanned diffracted light spots used to form the pixels of an image formed on a screen. Referring to FIG. 2 to describe this operation in detail, a diffractive optical modulator includes n upper reflective parts 150a to 150n, corresponding to an ath pixel, a bth pixel, a cth pixel, a dth pixel, an eth pixel, ..., an nth pixel, which form an image formed on the screen. The diffractive optical modulator is described with reference to a single upper reflective part designated by reference numeral 150a. Light, reflected from the reflective surfaces 150a1, 150a2, and 150a3 of the upper reflective part 150a and light, passed through the open holes 151a1, 151a2, and 151a3 of the upper reflective part 150a (where 151a3 is the interval between the upper reflective part 150a and an upper reflective part 150b adjacent thereto) and reflected from the lower reflective part 123, forms diffracted light. This diffracted light forms scanned diffracted light spots corresponding to the pixels of the image formed on the screen.

That is, the upper reflective parts 150a to 150n respectively form scanned diffracted light spots corresponding to the pixels of the image formed on the screen, together with the reflective surface of the lower reflective part 123 corresponding to the upper reflective parts. The scanned diffracted light spots are aligned in a line, thus forming a scan line (in this case, a scan line is assumed to be composed of n scanned diffracted light spots corresponding to n pixels).

Meanwhile, in the above-described open hole-based diffractive optical modulator, when piezoelectric voltage is applied to the left and right piezoelectric layers, the displacement of each upper reflective part, caused by the actuating force generated by the piezoelectric layer, exhibits hysteresis characteristics, as shown in FIGS. 3A and 3B. Referring to FIG. 3A, when the piezoelectric voltage to be applied to the left and right piezoelectric layers increases from 0V up to Vmax, the displacement of the upper reflective part is changed along line A. When the piezoelectric voltage decreases from Vmax down to 0V, the displacement of the upper reflective part exhibits hysteresis characteristics progressing along line B. Further, lines A and B are curved lines rather than straight lines, and thus exhibit non-linearity.

The hysteresis characteristics of the diffractive optical modulator exhibit the displacement characteristics of FIG. 3B when the piezoelectric voltage to be applied increases up to the maximum voltage Vmax, at which the maximum displacement is reached, decreases from the maximum voltage Vmax down to a voltage less than Vmax, and increases again from that voltage up to the maximum voltage Vmax.

That is, referring to FIG. 3B, the displacement characteristics of line B4 are exhibited when the application voltage increases from 0V up to the maximum voltage Vmax, at which the maximum displacement is reached, gradually decreases from Vmax down to voltage V4, and subsequently increases from V4 up to the maximum voltage Vmax.

Further, the displacement characteristics of line B3 are exhibited when the application voltage gradually decreases from Vmax down to voltage V3 and subsequently increases from V3 up to the maximum voltage Vmax.

Further, the displacement characteristics of line B2 are exhibited when the application voltage gradually decreases from Vmax down to V2 and subsequently increases from V2 up to the maximum voltage Vmax.

Further, the displacement characteristics of line B1 are exhibited when the application voltage gradually decreases from Vmax down to V1 and subsequently increases from V1 to the maximum voltage Vmax.

Meanwhile, the hysteresis characteristics of the diffractive optical modulator are also exhibited even when the application voltage increases from the minimum voltage up to an arbitrary voltage, at which desired displacement is reached, and then gradually decreases from the arbitrary voltage down to 0V.

Such hysteresis characteristics of the diffractive optical modulator make it difficult to determine the voltage to be applied to move the upper reflective part to a desired location.

Meanwhile, the above-described diffractive optical modulator exhibits a creep phenomenon in which, even if the same drive voltage is applied, the reflective part has different initial locations.

Such hysteresis and creep phenomenon make it difficult to determine the voltage required to move the upper reflective part to a desired location, and a solution to overcome this difficulty is required.

SUMMARY OF THE INVENTION

Accordingly, the present invention has been made keeping in mind the above problems occurring in the prior art, and the present invention is intended to provide an apparatus for resetting the location of the reflective part of a diffractive optical modulator, which resets the location of the reflective part of a diffractive optical modulator to an initial location at a specific time point, thus increasing the ability to control the location of the reflective part.

The present invention provides an apparatus for resetting a location of an upper reflective part of a diffractive optical modulator used in a display system for processing diffracted light, generated by the diffractive optical modulator, and generating continuous images, comprising a control unit for outputting a reset control signal when the diffracted light emitted from the diffractive optical modulator disposed in the display system is present in a first scan time section on a screen of the display system; and a reset driving circuit for initializing the diffractive optical modulator when a reset control signal is input from the control unit.

BRIEF DESCRIPTION OF THE DRAWINGS

The above and other objects, features and advantages of the present invention will be more clearly understood from the following detailed description taken in conjunction with the accompanying drawings, in which:

FIG. 4B is a diagram showing an apparatus for resetting the location of the reflective part of a diffractive optical modulator according to another embodiment of the present invention;

DESCRIPTION OF THE PREFERRED EMBODIMENTS

Hereinafter, embodiments of an apparatus for resetting the location of the reflective part of a diffractive optical modulator according to the present invention will be described in detail with reference to FIGS. 4A to 8.

Figure 4A:
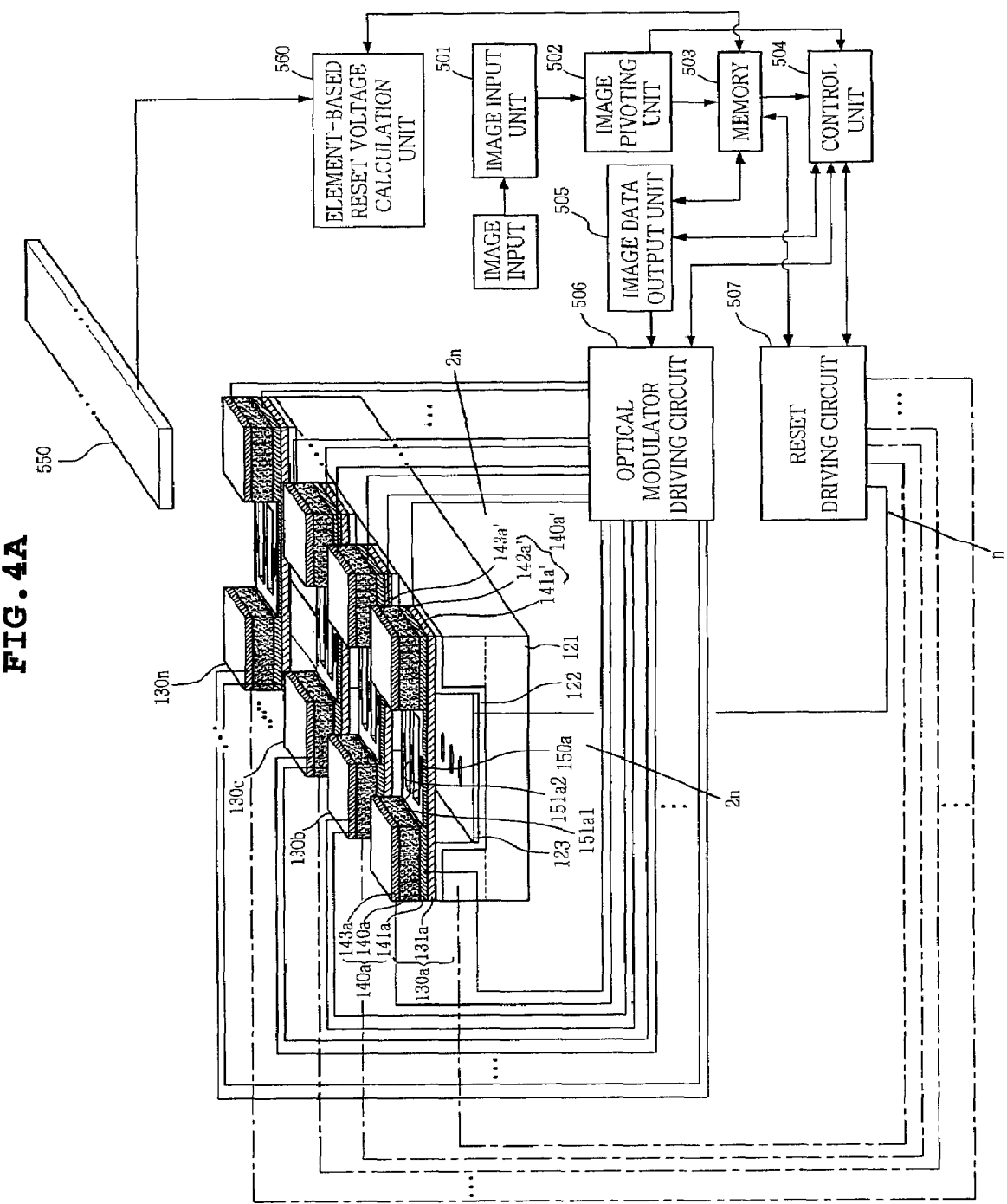
FIG. 4A is a diagram showing an apparatus for resetting the location of the reflective part of a diffractive optical modulator according to an embodiment of the present invention.

FIG. 4A is a diagram showing the construction of an apparatus for resetting the location of the reflective part of a diffractive optical modulator according to an embodiment of the present invention.

Referring to FIG. 4A, the apparatus for resetting the location of the reflective part of the diffractive optical modulator according to an embodiment of the present invention includes an image input unit 501, an image pivoting unit 502, memory 503, a control unit 504, an image data output unit 505, an optical modulator driving circuit 506, a reset driving circuit 507, a photosensor 550, and an element-based reset voltage calculation unit 560.

The image input unit 501 receives image data from an external device while receiving a vertical synchronization signal Vsync and a horizontal synchronization signal Hsync therefrom.

The image pivoting unit 502 performs data transposition to convert laterally arranged image data into vertically arranged image data, thus converting laterally input image data into vertical image data and storing the vertical image data in the memory 503. The reason for performing data transposition in the image pivoting unit 502 in this way is that the scan lines emitted from the diffractive optical modulator are adapted to laterally scan and display image data because scanned diffracted light spots corresponding to a plurality of pixels are vertically arranged.

The memory 503 is adapted to store the image data transposed by the image pivoting unit 502, and to store sample image data so as to perform a reset operation. The sample image data stored in the memory 503 may be arbitrary image data, which is used for a process of calculating element-based reset voltages, which will be described later. Further, the memory 503 is adapted to store element-based light intensities that are predicted to be measured for diffracted light emitted from respective elements when the drive voltage corresponding to the sample image data is applied to the diffractive optical modulator. Such predicted element-based light intensities are also used for the process of calculating element-based reset voltages, which will be described later.

The image data output unit 505 sequentially reads and outputs the image data stored in the memory 503.

The optical modulator driving circuit 506 modulates incident light by driving the diffractive optical modulator according to the image data output from the image data output unit 505, thus forming diffracted light having image information.

Further, the photosensor 550 detects the intensities of element-based light, emitted from respective elements corresponding to pixels, from the diffracted light emitted from the diffractive optical modulator, and outputs the element-based light intensities.

When the element-based light intensities measured by the photosensor 550 are input, the element-based reset voltage calculation unit 560 compares the element-based light intensities that are predicted to be output from respective elements when the drive voltage corresponding to sample image data is applied to the elements, with measured element-based light intensities input from the photosensor 550, thus calculating an element reset voltage.

Meanwhile, the reset driving circuit 507 is attached to a lower reflective part 123 and an upper reflective part 150a (in the case of, for example, a single element 130a).

When a reset control signal is input, the reset driving circuit 507 reads a reset voltage value stored in the memory 503 and applies the read reset voltage value to the upper reflective part 150a (in the case of, for example, a single element 130a) and the lower reflective part 123 of the diffractive optical modulator in a period during which the optical modulator driving circuit 506 is turned off, thus performing the reset operation corresponding to the applied voltage. This reset voltage value output from the reset driving circuit 507 is the value required to initialize the upper reflective parts 150a to 150n of the diffractive optical modulator, and is not to be understood to be a value of '0'.

The control unit 504 operates the diffractive optical modulator by controlling the optical modulator driving circuit 506, and resets the diffractive optical modulator by controlling the reset driving circuit 507.

Figure 5:
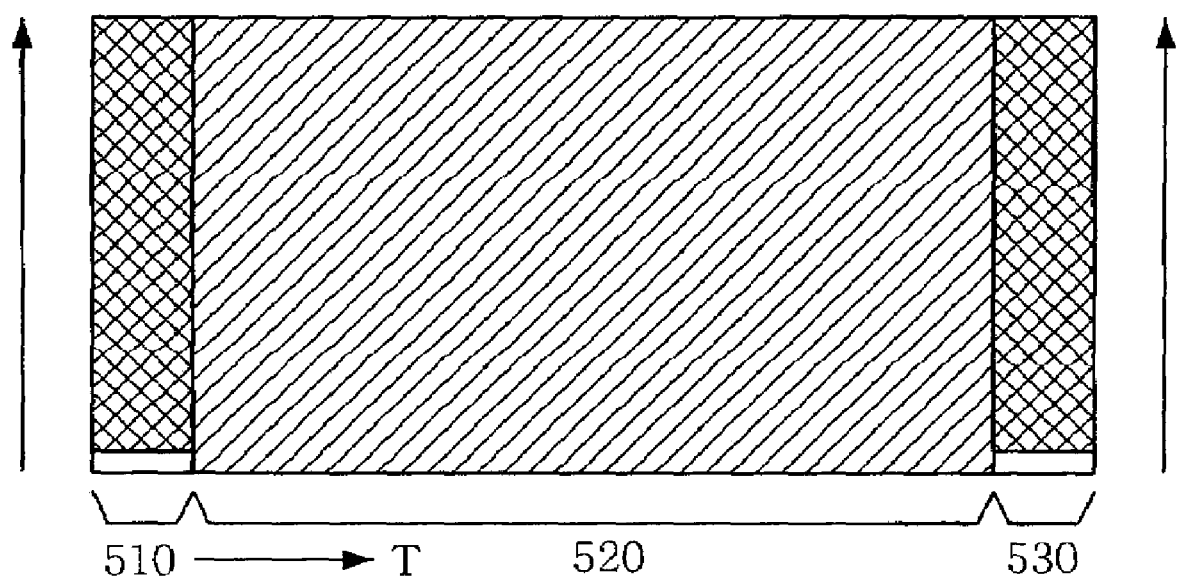
FIG. 5 is a diagram showing an effective picture section and a blank time section on the screen used in the present invention.

In a display device using the diffractive optical modulator, the control unit 504 of the apparatus for resetting the location of the reflective part of the diffractive optical modulator having the above construction causes image data to be output from the image data output unit 505 to the optical modulator driving circuit 506 in the period during which diffracted light is projected from the diffractive optical modulator onto the effective picture section of the screen (520 of FIG. 5), and turns off the optical modulator driving circuit 506 and outputs a reset control signal to the reset driving circuit 507 in the blank time section of the screen (510 or 530 of FIG. 5).

Referring to FIG. 5, the effective picture section 520, the first blank time section 510, and the second blank time section 530 are shown clearly. That is, referring to FIG. 5, a single frame image is composed of the effective picture section 520, during which image information desired to be shown to the user is output, and the first and second blank time sections 510 and 530 formed on opposite sides of the effective picture section 530 before and after the output of the effective picture section 520. The control unit 504 outputs the reset control signal to the reset driving circuit 507 so that a predetermined reset voltage is applied to the diffractive optical modulator in the first or second blank time section 510 or 530.

In this case, the first or second blank time section 510 or 530 may correspond to a period during which a single pixel is scanned in a horizontal direction or during which a plurality of pixels is scanned, and may be adjusted according to the application.

This operation is described with reference to the timing diagram of FIG. 6. The control unit 504 provides an ON data synchronization signal both to the image data output unit 505 and to the optical modulator driving circuit 506 in the effective picture section 520, thus causing the image data to be output from the image data output unit 505 to the optical modulator driving circuit 506. Further, in the blank time section 510 or 530, the control unit 504 provides an OFF data synchronization signal both to the image data output unit 505 and to the optical modulator driving circuit 506, thus preventing the image data from being output from the image data output unit 505 to the optical modulator driving circuit 506, and also provides both an ON reset synchronization signal and a reset control signal to the reset driving circuit 507.

Meanwhile, when the reset control signal is input, the reset driving circuit 507 reads the reset voltage value stored in the memory 503 and applies the reset voltage value to the upper reflective part (150a in the case of, for example, a single element 130a) and the lower reflective part 123 of the diffractive optical modulator in the blank time section 510 or 530, during which the optical modulator driving circuit 506 is turned off, thus performing the reset operation corresponding to the applied reset voltage. In this case, the reset voltage value, output from the reset driving circuit 507, is the value required to initialize the upper reflective parts 150a to 150n of the diffractive optical modulator, and is not to be understood to be a value of '0'.

Figure 1:
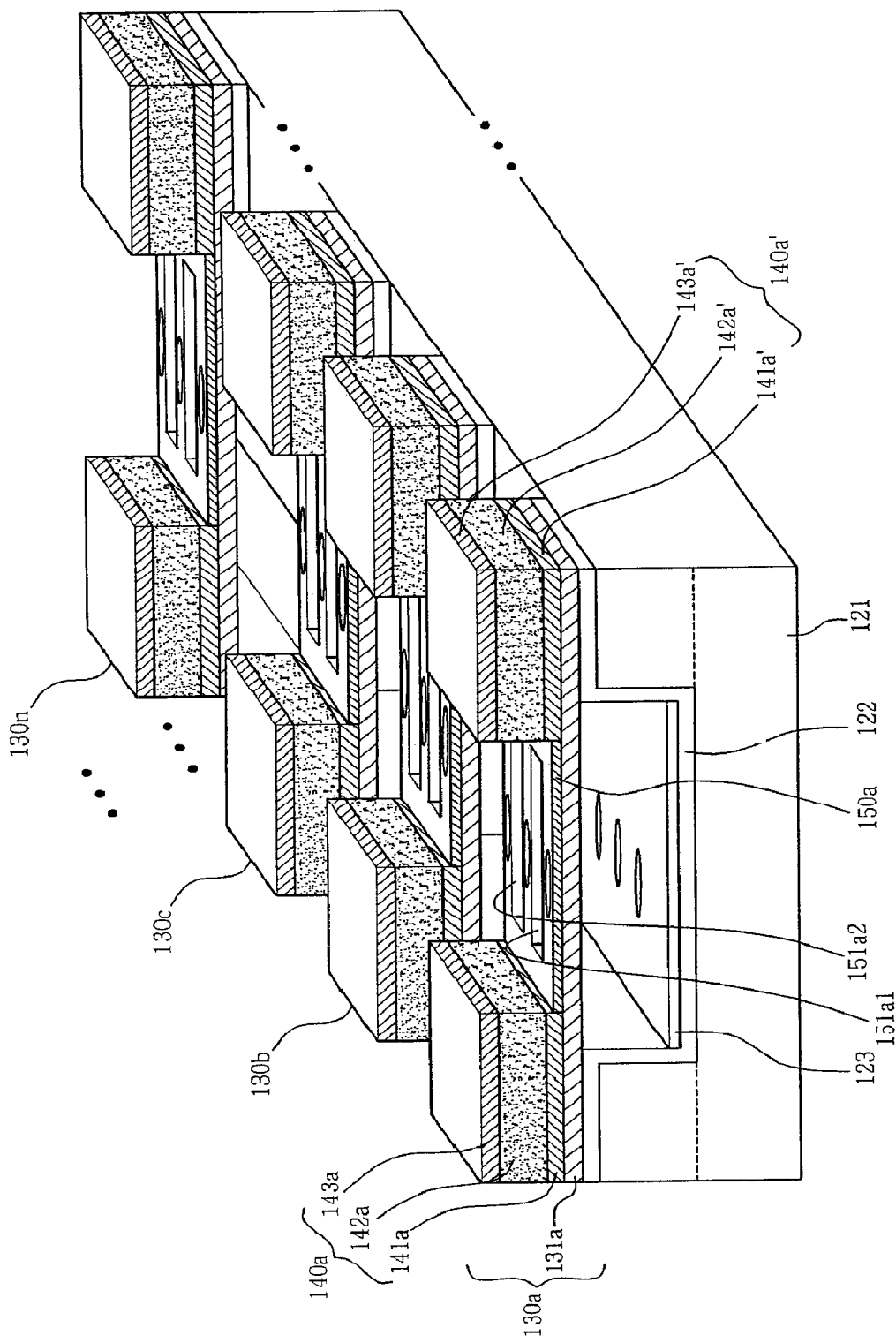
FIG. 1 is a perspective view showing a conventional open hole-based diffractive optical modulator.
Figure 2:
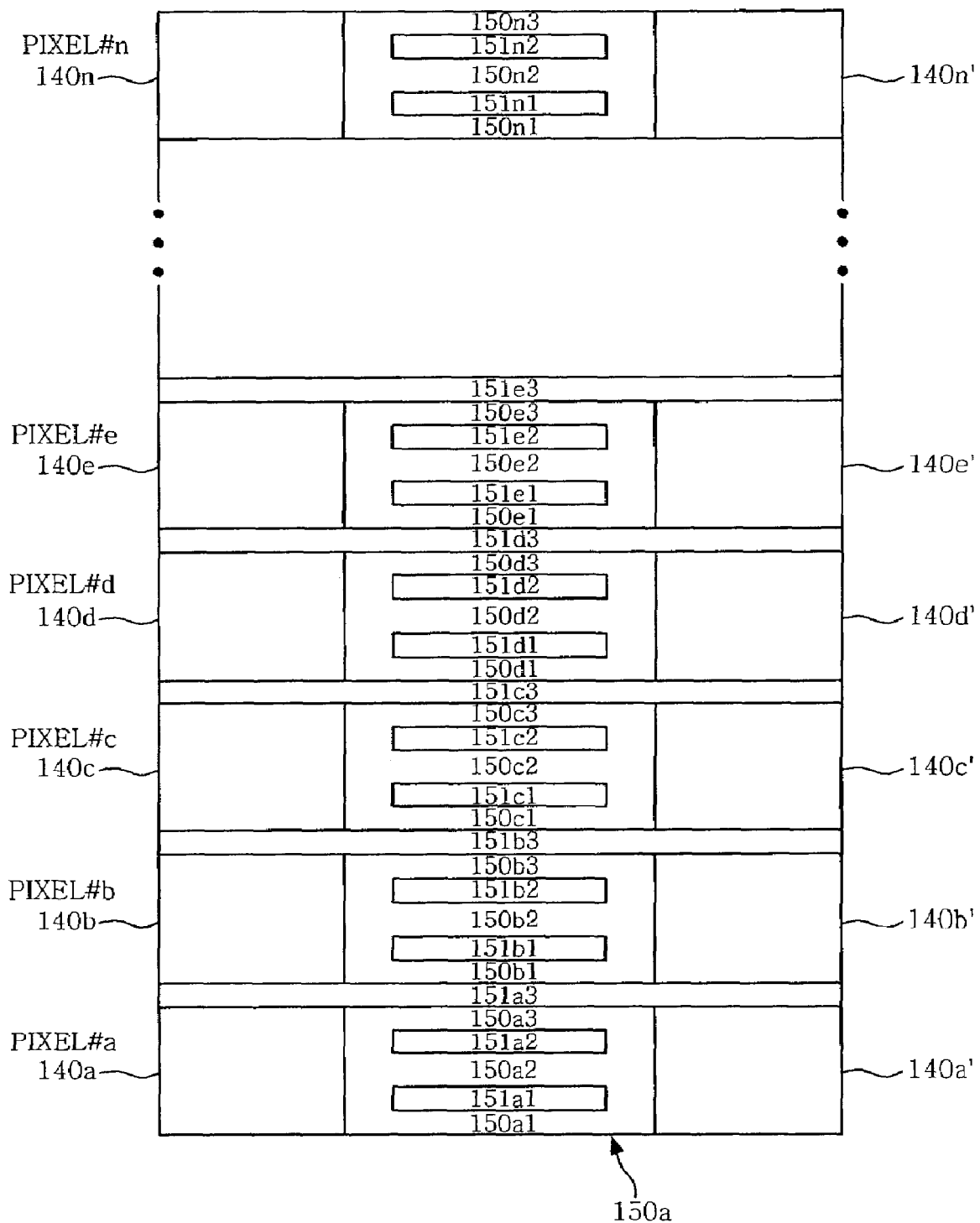
FIG. 2 is a plan view showing a conventional open hole-based diffractive optical modulator.
Figure 3A:
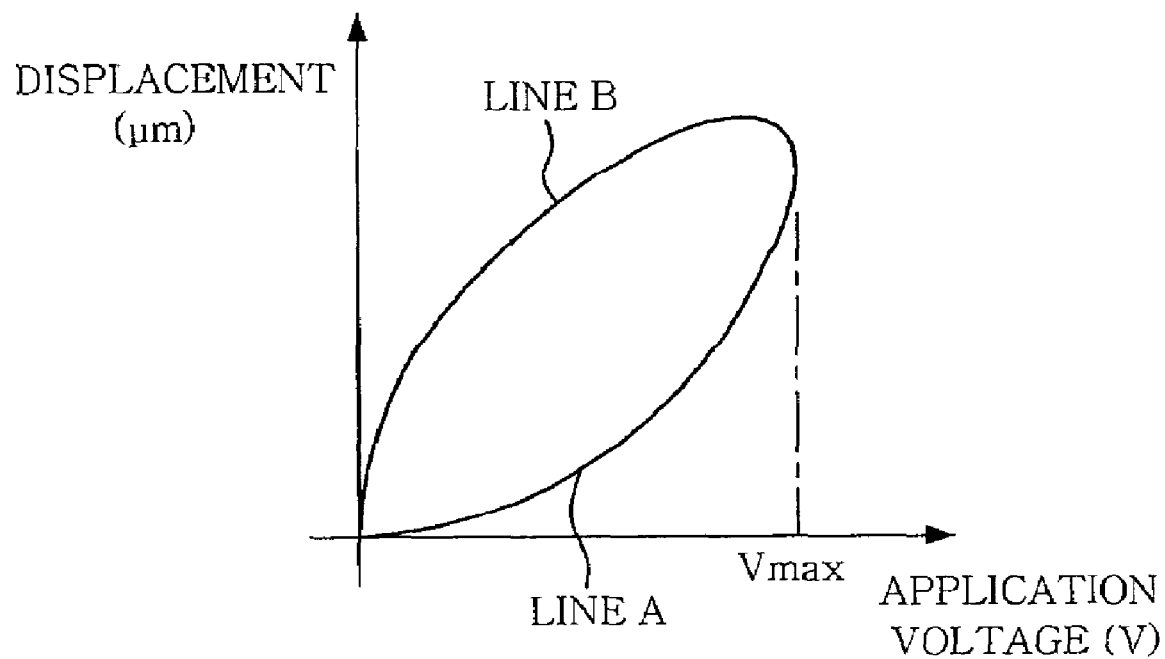
FIGS. 3A and 3B are diagrams showing the hysteresis characteristics of a typical actuator using a piezoelectric material.
Figure 3B:
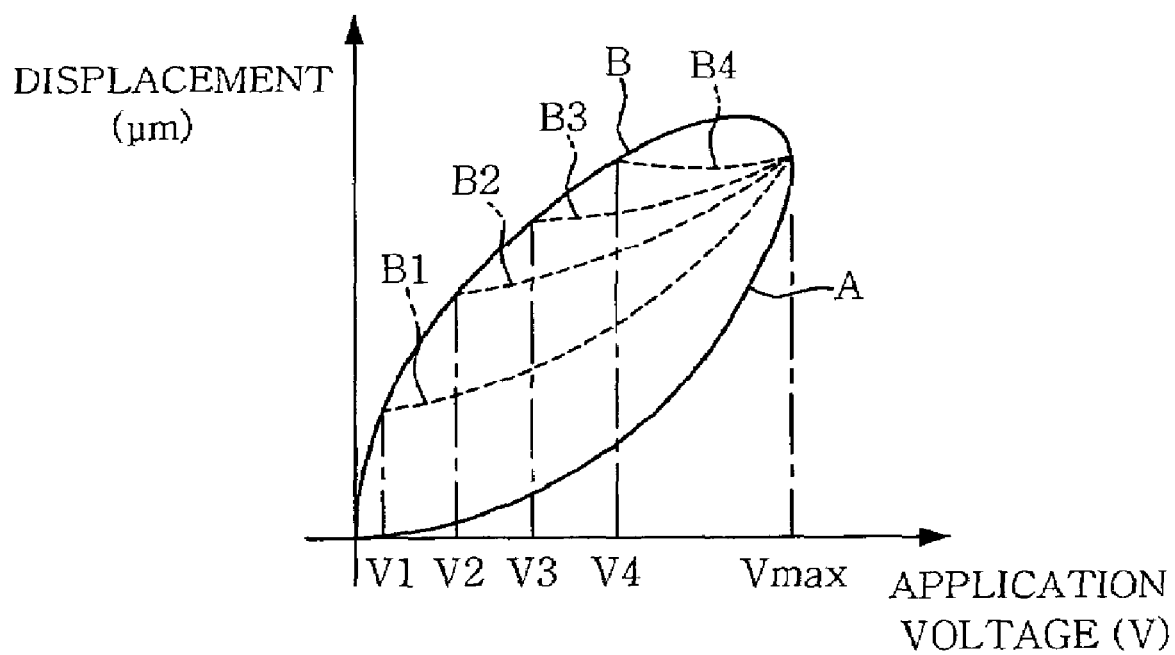

If the diffractive optical modulator is reset by the reset driving circuit 507 in this way, an application voltage versus displacement curve starts again at the initialized value, as shown in FIG. 3A, so that control is started at the location that does not greatly deviate from a predicted displacement curve in the effective picture section. Accordingly, a voltage value very close to the application voltage value required to obtain desired displacement can be obtained. As a result, in the diffractive optical modulator, the ability to control the location of the upper reflective part can be increased.

Meanwhile, the reset voltage value stored in the memory 503 may be preset to a certain value and may be stored, but may be calculated in such a way that, after the drive voltage corresponding to sample image data, stored in the memory 503, is provided to the diffractive optical modulator using the optical modulator driving circuit 506, the intensity of diffracted light emitted from the diffractive optical modulator is measured by the photosensor 550, and thus the element-based reset voltage calculation unit 560 can calculate reset voltages for respective elements.

That is, the control unit 504 transmits a sample voltage output control signal so that the drive voltage corresponding to the sample image data is output to the optical modulator driving circuit 506 at the time point at which the first or second blank time section 510 or 530 starts.

Then, the optical modulator driving circuit 506 reads the sample image data stored in the memory 503 and applies the drive voltage corresponding to the sample image data to the diffractive optical modulator.

Further, the photosensor 550 detects the intensities of element-based diffracted light, emitted from respective elements corresponding to pixels, and outputs the element-based light intensities to the element-based reset voltage calculation unit 560.

In this case, the memory 503 stores therein light intensities that are predicted to be measured when the drive voltage corresponding to the sample image data is applied to the diffractive optical modulator. The element-based reset voltage calculation unit 560 compares the element-based light intensities that are predicted to be output from respective elements when the drive voltage corresponding to the sample image data is applied and that are stored in the memory 503, with measured element-based light intensities, thus calculating an element reset voltage and storing the element reset voltage in the memory 503.

Figure 7:
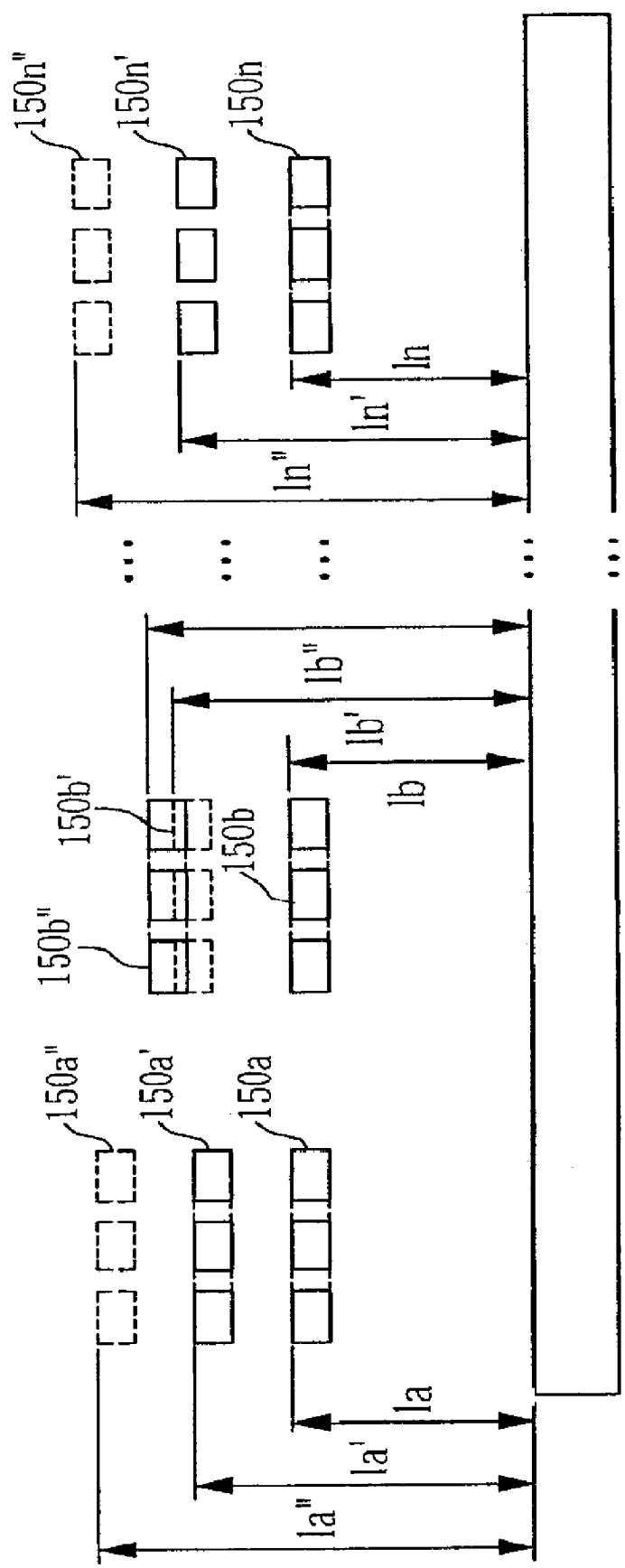
FIG. 7 is a diagram showing the displacement of an upper reflective part generated when a drive voltage corresponding to sample image data is applied to the diffractive optical modulator of FIGS. 4A and 4B.

That is, referring to FIG. 7, when a specific reference voltage is applied, displacement corresponding thereto is generated. In the case of an element having an upper reflective part 150*a*, when the drive voltage corresponding to sample image data is applied, location 150*a*' is predicted to be reached, but, in practice, location 150" may be reached. In this case, if the difference la between the heights of the upper reflective part 150*a* and the lower reflective part 123 is assumed to be λ/4 when the wavelength of incident light is λ, the intensity of diffracted light determined according to such displacement becomes less than predicted light intensity. Therefore, in order to move the upper reflective part, which was moved to the location designated by reference numeral 150*a*", to the location designated by reference numeral 150*a*, a reverse voltage, greater than that of the case where such displacement does not exist, must be applied both to the upper reflective part 150*a* and to the lower reflective part 123.

Of course, referring to FIG. 7, in the case of an element having an upper reflective part 150*b*, when the drive voltage corresponding to sample image data is applied, location 150*b*" is predicted to be reached, but, even when the element 150*a* is moved to a location lower than predicted location 150*b*", as in the case where the actual location 150*b*' is reached, the same description can be made. In this case, if the difference 1 b between the heights of the upper reflective part 150*b* and the lower reflective part 123 is assumed to be λ/4 when the wavelength of incident light is λ, the intensity of the diffracted light determined according to such displacement becomes greater than predicted light intensity. Therefore, in order to move the upper reflective part 150*b*, which was moved to the location designated by reference numeral 150*b*', to the location designated by reference numeral 150*b*, reverse voltage less than that of the case where such displacement does not exist must be applied both to the upper reflective part 150*b* and the lower reflective part 123.

As described above, the element-based reset voltage calculation unit 560 calculates an element reset voltage by comparing the predicted element-based light intensities, which are stored in the memory 503 and are predicted to be output from respective elements when drive voltage corresponding to the sample image data is applied to the elements, with measured element-based light intensities, and stores the element reset voltage in the memory 503.

In this embodiment, abnormal displacement has been measured using diffracted light emitted from the diffractive optical modulator, but can also be determined by measuring the capacitances charged in the upper reflective part and the lower reflective part.

FIG. 4B is a diagram showing the construction of an apparatus for resetting the location of the reflective part of the diffractive optical modulator according to another embodiment of the present invention. Compared to that of FIG. 4A, this embodiment is characterized in that a lower reflective part 123 is not used as a reference electrode for moving an upper reflective part 150*a*, but a separate reference electrode part 570, which is disposed over the upper reflective part 150*a* and is provided with terminals connected to a reset driving circuit 507, is provided. Such a reference electrode part 570 can be formed of a transparent element (Indium-Tin-Oxide: ITO), etc. The apparatus for resetting the location of the reflective part of the diffractive optical modulator according to another embodiment of the present invention is different from the reset apparatus of FIG. 4A in that it applies a reset voltage to the upper reflective part 150*a* and to the reference electrode part 570, rather than the upper reflective part 150*a* and the lower reflective part 123, and the remaining construction and operation thereof are the same as those of the reset apparatus of FIG. 4A.

Figure 8:
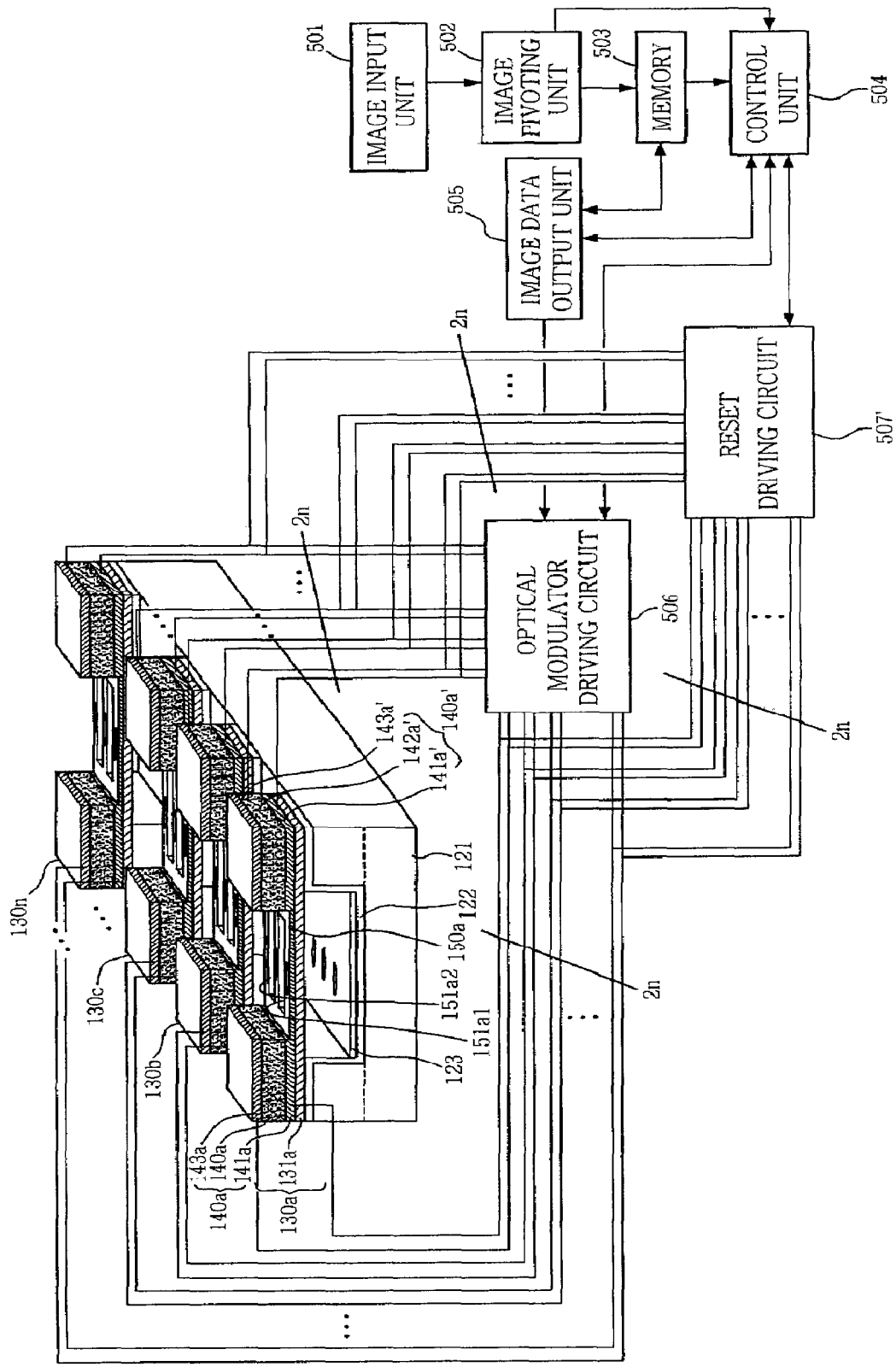
FIG. 8 is a diagram showing the construction of an apparatus for resetting the location of the reflective part of a diffractive optical modulator according to a further embodiment of the present invention.

FIG. 8 is a diagram showing the construction of an apparatus for resetting the location of the reflective part of a diffractive optical modulator according to a further embodiment of the present invention.

Referring to FIG. 8, the apparatus for resetting the location of the reflective part of the diffractive optical modulator according to a further embodiment of the present invention includes an image input unit 501, an image pivoting unit 502, memory 503, a control unit 504, an image data output unit 505, an optical modulator driving circuit 506, and a reset driving circuit 507'.

The image input unit 501 receives image data from an external device while receiving a vertical synchronization signal Vsync and a horizontal synchronization signal Hsync therefrom.

Further, the image pivoting unit 502 performs data transposition to convert laterally arranged image data into vertically arranged image data, thus converting laterally input image data into vertical image data and storing the vertical image data in the memory 503.

The memory 503 is adapted to store the image data, transposed by the image pivoting unit 502, and a reset voltage.

The image data output unit 505 sequentially reads and output the image data stored in the memory 503.

The optical modulator driving circuit 506 modulates incident light by driving the diffractive optical modulator according to the image data output from the image data output unit 505, thus forming diffracted light having image information.

Further, the image data output unit 505 sequentially reads the image data, which is transposed by the image pivoting unit 502 and is stored in the memory 503, from the first column to the last column and outputs the read image data during a scanning period.

Meanwhile, in the display device using the diffractive optical modulator, the control unit 504 causes image data to be output from the image data output unit 505 to the optical modulator driving circuit 506 in the period during which diffracted light is projected from the diffractive optical modulator onto the effective picture section of the screen (520 of FIG. 5), and turns off the optical modulator driving circuit 506 and outputs a reset control signal to the reset driving circuit 507' in the blank time section (510 or 530 of FIG. 5) of the screen.

Figure 6:
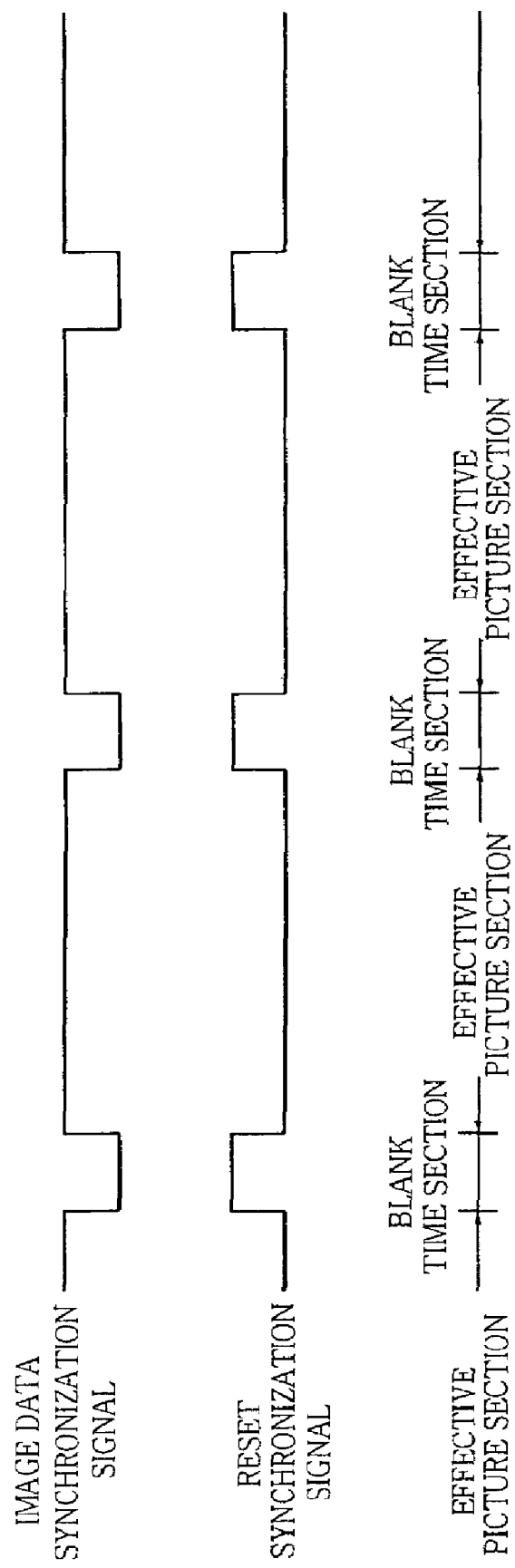
FIG. 6 is a timing diagram showing synchronization signals provided by the control unit of FIGS. 4A and 4B to an image data output unit, an optical modulator driving circuit, and a reset driving circuit.

Referring to the timing diagram of FIG. 6, the control unit 504 provides an ON data synchronization signal both to the image data output unit 505 and to the optical modulator driving circuit 506 in the effective picture section 520, thus causing the image data to be output from the image data output unit 505 to the optical modulator driving circuit 506. Further, in the blank time section 510 or 530, the control unit 504 provides an OFF data synchronization signal both to the image data output unit 505 and to the optical modulator driving circuit 506, thus preventing the image data from being output from the image data output unit 505 to the optical modulator driving circuit 506, and also provides both an ON reset synchronization signal and a reset control signal to the reset driving circuit 507', thus causing the reset driving circuit 507' to reset the diffractive optical modulator.

In this case, the reset driving circuit 507' applies a reset voltage both to the upper electrode layer (143a and 143a' in the case of a single element 130a) and to the lower electrode layer 141a and 141a' of the diffractive optical modulator in the blank time section 510 or 530, during which the optical modulator driving circuit 506 is turned off, thus performing a reset operation. In this case, the reset voltage output from the reset driving circuit 507' denotes the minimum voltage at which lines A and B are coincident with each other in the hysteresis curve of the diffractive optical modulator of FIG. 3A, and is not to be understood to be a value of '0'.

If the diffractive optical modulator is reset by the reset driving circuit 507' in this way, an application voltage versus displacement curve starts again at the initialized value, as shown in FIG. 3A, so that control is started at the location that does not greatly deviate from a predicted displacement curve in the effective picture section. Accordingly, a voltage value very close to the application voltage value required to obtain desired displacement can be obtained. As a result, in the diffractive optical modulator, the ability to control the location of the upper reflective part can be increased.

Accordingly, the present invention is advantageous in that the location of an upper reflective part can be initialized using a convenient method, thus suppressing abnormal operation caused by the hysteresis characteristics of the diffractive optical modulator.

Further, the present invention is advantageous in that the location of an upper reflective part is initialized, thus preventing abnormal operation caused by the creep phenomenon of the diffractive optical modulator.

Further, the present invention is advantageous in that the location of an upper reflective part is initialized, so that the possibility of predicting the location corresponding to subsequently applied voltage can be increased, and thus the ability to control the location of the upper reflective part can be increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for resetting a location of an upper reflective part of a diffractive optical modulator used in a display system for processing diffracted light, generated by the diffractive optical modulator, and generating continuous images, comprising:
   a control unit for outputting a reset control signal when the diffracted light emitted from the diffractive optical modulator disposed in the display system is present in a first scan time section on a screen of the display system; and
   a reset driving circuit for initializing the diffractive optical modulator when a reset control signal is input from the control unit.

2. The apparatus according to claim 1, wherein the diffractive optical modulator comprises:
   a substrate;
   at least one first reflective part supported by the substrate and provided with a center portion spaced apart from the substrate to ensure a space, the first reflective part being constructed so that a surface thereof oriented toward the substrate is formed of a reflective surface to reflect incident light and is provided with at least one open hole formed therein to pass therethrough the incident light;
   a second reflective part disposed between the substrate and the first reflective part to be spaced apart from the first reflective part to secure a space, and provided with a reflective surface for reflecting light, which has passed through the open hole of the first reflective part and is incident on the reflective surface; and
   driving means for moving a center portion of a given first reflective part far away from or close to the substrate, thus varying intensity of diffracted light generated by light reflected from the first reflective part and the second reflective part.

3. The apparatus according to claim 2, wherein the reset driving circuit initializes the diffractive optical modulator by applying reverse voltage to both the first and second reflective parts.

4. The apparatus according to claim 2, wherein:
   the diffractive optical modulator further comprises a reference electrode part spaced apart from the first reflective part, and
   the reset driving circuit initializes the diffractive optical modulator by applying reverse voltage to both the first reflective part and the reference electrode part.

5. The apparatus according to claim 4, wherein the reference electrode part is disposed in an optical path of the diffractive optical modulator and is formed of a transparent electrode.

6. The apparatus according to claim 3, further comprising:
   a light detection unit for measuring intensity of light emitted from the diffractive optical modulator; and
   a reset voltage calculation unit for comparing light intensity measured by the light detection unit with light intensity predicted when a drive voltage corresponding to sample image data is applied, thus calculating a reverse voltage,
   wherein the control unit applies the drive voltage corresponding to the sample image data to the diffractive optical modulator at a specific time point, and causes the reset voltage calculation unit to calculate and output a reset voltage at a predetermined time point.

7. The apparatus according to claim 6, wherein the light detection unit is a photosensor.

8. The apparatus according to claim 3, further comprising:
   a capacitance measurement unit for measuring capacitances of the first and second reflective parts; and
   a reset voltage calculation unit for calculating a reverse voltage using the capacitances measured by the capacitance measurement unit.

9. The apparatus according to claim 2, wherein the reset driving circuit initializes the diffractive optical modulator by applying a reset voltage to the driving means.

10. The apparatus according to claim 1, further comprising:
    an image input unit for receiving image data from an external device;
    memory for storing the image data received from the image input unit;
    an image data output unit for sequentially reading the input image data from a first column of data to a last column of data from the memory in a second scan time section; and an optical modulator driving circuit for providing a drive signal corresponding to the image data output from the image data output unit to the diffractive optical modulator.

11. The apparatus according to claim 10, further comprising an image pivoting unit for performing data transposition to convert laterally arranged image data, which has been input to the image input unit, into vertically arranged image data, thus converting the laterally input image data into vertical image data and storing the vertical image data in the memory.

12. The apparatus according to claim 10, wherein the second scan time section is an effective picture section.

13. The apparatus according to claim 1, wherein the first scan time section is a blank time section.

* * * * *